(12) United States Patent  (10) Patent No.: US 8,905,829 B2
Chen  (45) Date of Patent: Dec. 9, 2014

(54) VENTILATING SYSTEM AND VENTILATING SYSTEM CONTROL METHOD

(75) Inventor: Xiangyang Chen, Tokyo (JP)

(73) Assignee: Azbil Corporation, Tokyo (JP)

( * ) Notice: Subject to any disclaimer, the term of this patent is extended or adjusted under 35 U.S.C. 154(b) by 1322 days.

(21) Appl. No.: 12/409,768

(22) Filed: Mar. 24, 2009

(65) Prior Publication Data

US 2009/0247064 A1    Oct. 1, 2009

(30) Foreign Application Priority Data

Mar. 28, 2008    (JP) ................................. 2008-086461

(51) Int. Cl.
*F24F 7/007*    (2006.01)
*F24F 11/00*    (2006.01)

(52) U.S. Cl.
CPC ........... *F24F 11/0079* (2013.01); *Y02B 30/746* (2013.01); *F24F 2011/0042* (2013.01)
USPC ....................................................... 454/239

(58) Field of Classification Search
CPC ...................................................... F24F 7/007
USPC ....................................................... 454/239
See application file for complete search history.

(56) References Cited

U.S. PATENT DOCUMENTS 5,957,506 A * 9/1999 Stepp ............................ 285/183
2003/0235635 A1* 12/2003 Fong et al. ...................... 425/73

FOREIGN PATENT DOCUMENTS

JP    2002-039580    2/2002

* cited by examiner

*Primary Examiner* — Kang Hu
*Assistant Examiner* — Samantha Miller
(74) *Attorney, Agent, or Firm* — Troutman Sanders LLP

(57) ABSTRACT

To provide a ventilating system and ventilating system control method capable of advancing energy conservation. A controller sets a static pressure setting value based on the airflow of the system as a whole, calculated from the airflow of venturi air valves of fume hoods that are operating, and controls the speed of rotation of a fan based on the static pressure setting value and the static pressure within a main duct. Doing so enables control of the speed of rotation of the fan to be performed while ensuring the airflow of the ventilating system, thus making it possible to prevent wasted motive force of the fan, even when the airflows of each of the venturi air valves are not identical and even when the changes in resistance of the branched duct system relative to the various changes in airflow are not identical, with the result that it is possible to advance energy conservation.

4 Claims, 10 Drawing Sheets

FIG. 3

| No. | Diameter (mm) | Airflow (m³ per hour) | Operating differential pressure (Pa) | Warning differential pressure (Pa) |
|---|---|---|---|---|
| 1 | 200 | 1000 | 150 -750 | 75 |
| 2 | 250 | 1500 | 150 -750 | 75 |
| 3 | 300 | 2000 | 150 -750 | 75 |

FIG. 4

| Least-favored number | Valve number | Valve airflow (m³ per hour) | System airflow (m³ per hour) | Least-favored differential pressure lower limit (Pa) |
|---|---|---|---|---|
| 1 | 2# | 2000 | 2000 | -220 |
| 2 | 3# | 1500 | 3500 | -232 |
| 3 | 4# | 1500 | 5000 | -247 |
| 4 | 1# | 1000 | 6000 | -261 |
| 5 | 7# | 2000 | 8000 | -295 |
| 6 | 6# | 1500 | 9500 | -325 |
| 7 | 5# | 1500 | 11000 | -360 |
| 8 | 8# | 1000 | 12000 | -390 |

Air Flow

Utilization Rate (%)

FIG. 6

| No. | System airflow (m³ per hour) | Utilization rate (%) | Least-favored differential pressure lower limit (Pa) | Single-unit margins |
|---|---|---|---|---|
| 1 | 1000 | 8 | -215 | |
| 2 | 1500 | 13 | -218 | 2.5 |
| 3 | 2000 | 17 | -220 | 5 |
| 4 | 3500 | 29 | -232 | 12 |
| 5 | 5000 | 42 | -247 | 15 |
| 6 | 6000 | 50 | -261 | 14 |
| 7 | 8000 | 67 | -295 | 34 |
| 8 | 9500 | 79 | -325 | 30 |
| 9 | 11000 | 92 | -360 | 35 |
| 10 | 12000 | 100 | -390 | 30 |

FIG. 11

| No. | System Airflow (m³ per hour) | Utilization Rate (%) | Least-favored Required Static Pressure (Pa) | Unit Margins (Pa) |
|---|---|---|---|---|
| 1 | 1000 | 8 | 290 | 2.0 |
| 2 | 1500 | 13 | 292 | 2.3 |
| 3 | 2000 | 17 | 295 | 3.1 |
| 4 | 2500 | 21 | 298 | 3.6 |
| 5 | 3000 | 25 | 302 | 4.2 |
| 6 | 3500 | 29 | 306 | 4.7 |
| 7 | 4000 | 33 | 311 | 5.3 |
| 8 | 4500 | 38 | 316 | 5.7 |
| 9 | 5000 | 42 | 322 | 6.4 |
| 10 | 5500 | 46 | 328 | 6.9 |
| 11 | 6000 | 50 | 335 | 7.5 |
| 12 | 6500 | 51 | 343 | 8.0 |
| 13 | 7000 | 58 | 351 | 8.5 |
| 14 | 7500 | 63 | 359 | 9.1 |
| 15 | 8000 | 67 | 368 | 9.6 |
| 16 | 8500 | 71 | 378 | 10.2 |
| 17 | 9000 | 75 | 388 | 10.7 |
| 18 | 9500 | 79 | 399 | 11.3 |
| 19 | 10000 | 83 | 410 | 11.8 |
| 20 | 10500 | 88 | 422 | 12.4 |
| 21 | 1000 | 92 | 434 | 12.9 |
| 22 | 11500 | 96 | 447 | 13.5 |
| 23 | 12000 | 1000 | 461 | |

VENTILATING SYSTEM AND VENTILATING SYSTEM CONTROL METHOD

CROSS REFERENCE TO PRIOR APPLICATIONS

The present application claims priority under U.S.C. §119 to Japanese Patent Application No. 2008-086461, filed Mar. 28, 2008. The content of both applications are incorporated herein by reference in their entirety.

AREA OF TECHNOLOGY

The present invention relates to controlling the speed of rotation of a fan in a ventilating system, and relates to a setting value generating device for generating a setting value used in controlling the speed of rotation, relates to a setting value generating method, and to a ventilating system that uses the setting value to control the speed of rotation of a fan.

BACKGROUND OF THE INVENTION

In systems for strictly controlling air flows and static pressures for safety control and quality assurance in research facilities, hospitals, factories, and the like, constant airflow equipment, known as "venturi air valves" are often used in order to achieve room pressure control and local exhaust control.

Venturi air valves, as illustrated in FIG. 12, are constant airflow devices comprising, for example, a venturi tube 101 made from a pipe wherein a narrow section is formed in essentially the center portion thereof; a shaft 102 that is disposed on the inside of the venturi tube 101 so that the venturi tube 101 and the axis line will be coincident, with one end supported on the end portion of the upstream side of the venturi tube 101; a position lever that she supports the other end of the shaft 102 and shifts the shaft 102 in the direction of the axis line; and a cone 104 that is attached to the shaft 102 by a spring 104a. This cone 104 is positioned between a recessed portion of the venturi tube 101 and the upstream side end portion of the venturi tube 101, and a biasing force towards the upstream side of the venturi tube 101 is applied by the spring of 104a.

In this type of venturi air valve, air flows from the upstream side to the downstream side due to the differential pressure between the upstream side and the downstream side of the venturi tube 101; however, at this time, the amount of flow of the air is maintained at a specific level depending on the position of the position lever 103 if the differential pressure is within a specific range. That is, if the differential pressure becomes larger, for example, the airspeed increases, but because the cone 104 will move towards the downstream side, the cross-sectional area of the gap through which the air flows, between the venturi tube 101 and the cone 104, will become smaller. As a result, the increase in speed of the airflow is offsetted by the amount of reduction in the cross-sectional area of the gap, resulting in the airflow remaining constant. Conversely, when the differential pressure becomes smaller, the speed of flow becomes slower, but the cross-sectional area of the gap through which the air flows between the venturi tube 101 and the cone 104 becomes larger because the cone 104 moves to the upstream side. Consequently, the amount of reduction in the speed of flow is offsetted by the amount of increase in the cross-sectional area of the gap, with the result that the airflow remains constant.

As described above, the cone 104 of the venturi air valve is disposed within the venturi tube 101 that forms the airflow path, and, in order to reduce costs, typically there is no detection of the position of the cone 104. Because of this, in systems that are provided with venturi air valves, the control of the speed of rotation of the fan that draws air from the device wherein the venturi air valve is equipped is controlled through constant rotational speed control (described in, for example, Japanese Unexamined Patent Application Publication No. 2002-39580) without referencing the position of the cone 104, or control is performed so as to maintain a constant static pressure in the main duct.

However, in the conventional system set forth above, the following problems arise when the airflow of the fan has been reduced.

When there is constant rotational speed control, then when, as illustrated in FIG. 13, the airflow is reduced from Q1 to Q2, the operating point of the fan moves from A to A' (arrow a), not only causing an increase in the head, but also reducing the duct resistance from B to B' (arrow b). This increased fan head a and the decreased duct resistance (or the head corresponding thereto) β is all absorbed in the venturi air valve or a damper. Consequently, when there is a reduction in airflow from Q1 to Q2, there will be an increase in the resistance of the venturi air valve or the damper equal to α+β.

Additionally, when the static pressure of the main duct is controlled so as to be constant, then, as illustrated in FIG. 13, when there is a reduction in the airflow from Q1 to Q2, the operating point of the fan shifts from A to A" (arrow c), and so even though the head does not change, the duct resistance will be decreased from B to B' (arrow b). This change B in the amount of resistance is absorbed in the venturi air valve or the damper. Consequently, when there is a decrease in airflow from Q1 to Q2, then there will be an increase in the resistance of the venturi air valve or the damper equal to β.

In this way, in a system that uses the conventional venturi air valves, when there is a decrease in the airflow of the fan, then the increased head or the decreased duct resistance will be absorbed by the venturi air valve or the duct, which is a waste of the driving force of the fan, and thus, by extension, becomes an impediment to energy conservation.

Additionally, in the conventional system there was either only constant rotational speed control or constant static pressure control, as described above, and thus there was no thought given to structures with branching ducts or to the capacity of multiple venturi air valves. Because of this, it was not possible to perform tight control when applied to ventilating system structures.

Given this, the object of the invention of the present application is to provide a ventilating system and a control method for a ventilating system capable of advancing energy conservation.

SUMMARY OF THE INVENTION

In order to eliminate the issues such as described above, the ventilating system according to the present invention is a multi-branched duct system including a main duct and a plurality of branch ducts that branch from the main duct; a plurality of exhaust devices for expelling, to the outside of the devices, inside air through a venturi air valve that is connected to any of the branch ducts; a fan that is equipped in the main duct; and a control device for controlling the speed of rotation of the fan; wherein: the control device sets a target static pressure value based on the airflow of the entire system, calculated from the airflow of the venturi air valve of the exhaust device during operation, and controls the speed of rotation of the fan based on the static pressure within the main duct and the target value.

The ventilating system set forth above further includes: a recording portion for recording the relationship between the airflow of the entire system and the target static pressure, wherein: the control device sets the target static pressure value based on the relationship recorded in the recording portion; and the recording portion obtains the relationship through gradually decreasing the airflow of the entire system from a state wherein all of the exhaust devices are operating, assigning sequence positions to the exhaust devices corresponding to the venturi air valves in a sequence that does not produce a pressure differential between sequential venturi air valves when the venturi air valves are operating properly, and recording the minimum static pressure value in the main duct that is required when actuating one or more of the exhaust devices beginning with the low sequence position.

In the ventilating system described above, the recording portion obtains the relationship through adding the minimum static pressure value to an amount of change of a lower limit value for the static pressure in the main duct when the exhaust device corresponding to the venturi air valve with the greatest airflow of the venturi air valves has been actuated.

Additionally, the method for controlling the ventilating system according to the present invention is a ventilating system control method for a ventilating system including: a multi-branched duct system having a main duct and a plurality of branch ducts that branch from the main duct; a plurality of exhaust devices for expelling, to the outside of the devices, inside air through a venturi air valve that is connected to any of the branch ducts; and a fan that is equipped in the main duct, wherein: during operation, the control device sets a target static pressure value based on the airflow of the entire system, calculated from the airflow of the venturi air valve of the exhaust device during operation, and controls the speed of rotation of the fan based on the static pressure within the main duct and the target value.

Given the present invention, it is possible to control the speed of rotation of a fan after securing the ventilating system airflow through controlling the speed of rotation of the fan based on a static pressure within a main duct and on a target value, after setting a target static pressure value based on the airflow of the system as a whole, calculated from the air flows of venturi air valves to an exhaust device during operation, and thus even when there are different air flows in the individual venturi air valves and even when there are differences in changes in resistance of the ducts relative to the changes in the individual air flows, it is still possible to prevent waste of the driving force of the fan, which, as a result, enables an advancement in energy conservation.

BRIEF DESCRIPTION OF THE DRAWINGS

FIG. 3 is a diagram illustrating the specifications for the venturi air valves used in the ventilating system in FIG. 1.

FIG. 4 is a diagram illustrating the least-favored branch sequence in the ventilating system in FIG. 1.

FIG. 6 is a diagram illustrating the relationship between the utilization rate and the least-favored differential pressure lower limit in the ventilating system in FIG. 1.

FIG. 11 is a diagram illustrating the change in margin relative to the current airflow for each system airflow of 500 $m^3$ per hour in the ventilating system in FIG. 1.

DETAILED DESCRIPTION OF THE INVENTION

Figure 1A:
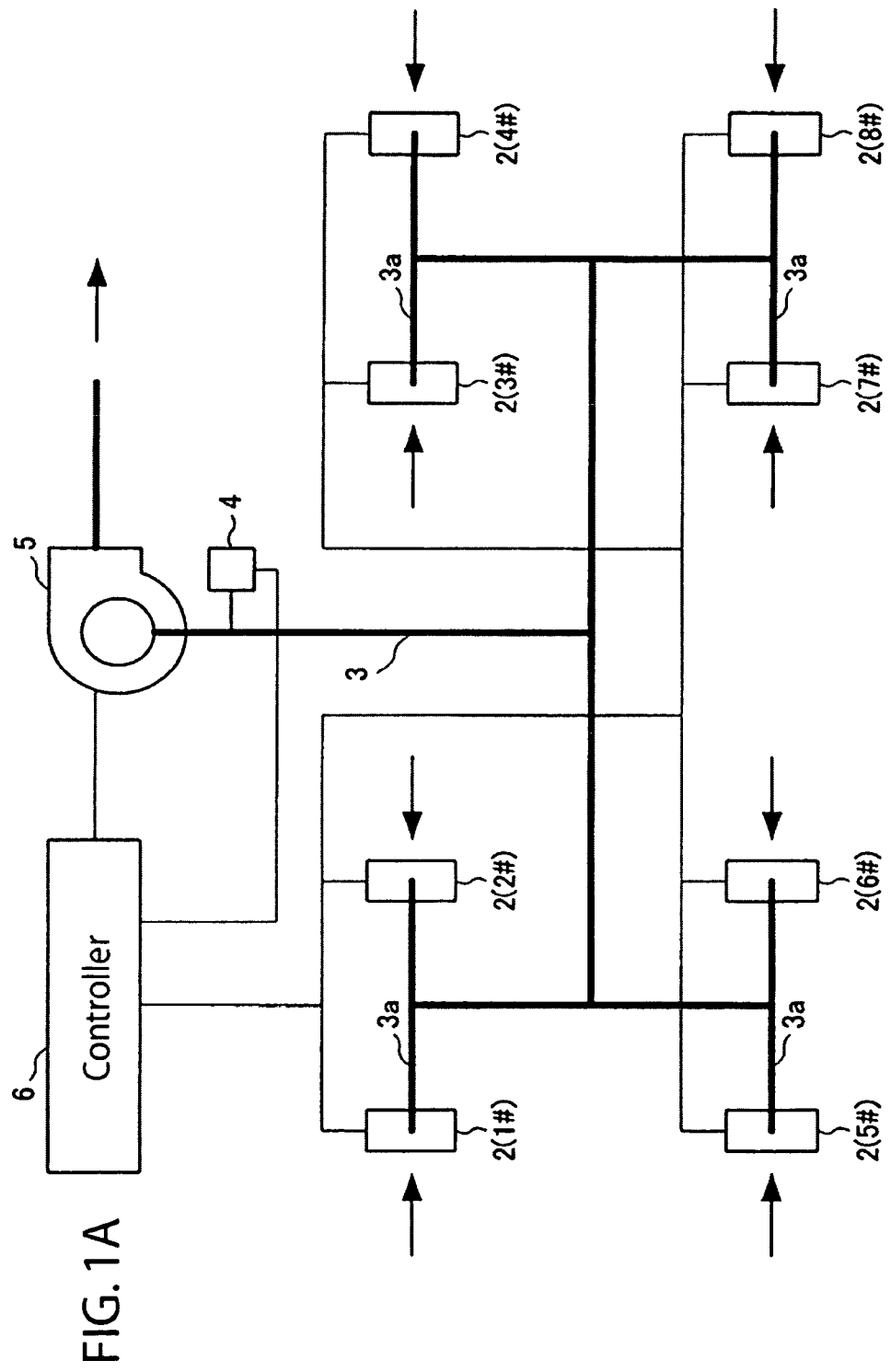
FIG. 1(a) is a diagram illustrating the structure of a ventilating system according to the present invention, and (b) is a diagram illustrating the structure of a controller.

A form of embodiment of the present invention will be described in detail below, referencing the figures.
Ventilating System Structure As is illustrated in FIG. 1(a) a ventilating system 1 according to the present form of embodiment is provided with: multiple fume hoods 2; a main duct 3, to which is connected multiple branched ducts 3a from each of the fume hoods 2; a pressure gauge 4 for measuring the static pressure in the main duct 3; a fan 5 connected to the output end of the main duct 3; and a controller 6 for controlling the operation of the ventilating system 1 as a whole.

The fume hoods 2 are structured from well known fume ducts that are provided with venturi air valves (not shown), and that send the air from the inside to the branched ducts 3a. These fume hoods 2 are provided with differential pressure transmitting devices (not shown) for detecting the differences in pressure before and after the venturi air valves, and for issuing a warning if the differential pressure falls below a predetermined value. The differential pressure transmitting devices transmit warnings to the controller 6.

The main duct 3 is connected through the branch ducts 3a to each of the fume hoods 2, and the air within each of the fume hoods 2 is directed to the fan 5. In the present form of embodiment, a multiple branch duct system, wherein multiple branches are formed, is structured from the main duct 3 in the multiple branched ducts 3a.

A pressure gauge 4 is structured from a known pressure gauge, and measures the static pressure of the main duct 3 and sends the measured value to the controller 6.

The fan 5 is structured from a known fan, and draws air from within each of the fume hoods 2 through the main duct 3 and the branch ducts 3a, and exhausts the air to the outside.

Figure 1B:
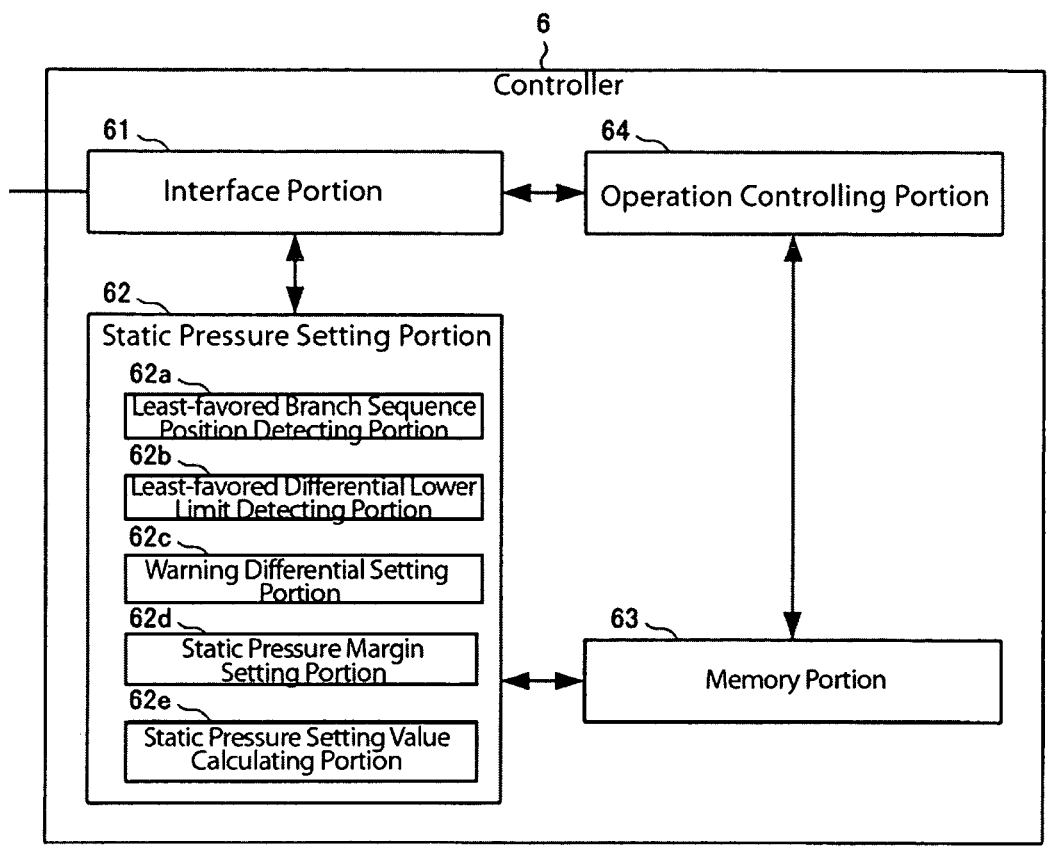

The controller 6, as illustrated in FIG. 1(b), is provided with an interface portion (hereinafter termed the "I/F portion") 61, a static pressure setting portion 62, a memory portion 63, and an operation controlling portion 64.

The I/F portion 61 is a functional portion that exchanges various types of signals and information between the fume hoods 2, which include the venturi air valves, the pressure gauge 4, and the fan 5.

The static pressure setting portion 62 exchanges various types of information, through the I/F portion 61, between the fume hoods 2, the pressure gauge 4, and the fan 5, and is a functional portion for setting the static pressure setting value that is used for controlling the operation of the fan 5. This type of static pressure setting portion 62 is provided with: a least-favored branch sequence detecting portion 62a for determining the sequence in which the branches are most susceptible to being influenced by the head of the fan 5 (that is, the least-favored branches) based on warnings from the differential pressure transmitting devices; a least-favored pressure differential lower limit detecting portion 62b for detecting the value of the static pressure of the main duct 3 at the minimum speed of rotation of the fan 5 at which no warning is sent from the differential pressure transmitting devices (that is, the least-favored differential pressure lower limit); a warning differential setting portion 62c for setting the warning differential that is the differential when the least-favored differential pressure lower limit is lower than the normal operation of the venturi air valve; a static pressure margin setting portion 62d that is the setting for the static pressure margin that is the offset of the static pressure setting value; and a static pressure setting value calculating portion 62e for calculating the static pressure setting value. Here the static pressure setting value is the value that is used in the speed of rotation control for the fan 5, and refers to the value of the static pressure in the main duct 3.

The memory portion 63 is a functional portion for storing each type of information that is required for the operation of the ventilating system 1.

An operation controlling portion 64 performs operational control of the fan 5 based on the operating status of each of the fume hoods 2, the measured value by the pressure gauge 4, and the static pressure setting value that has been set by the static pressure setting portion 62.

This type of controller 6 is structured from a computer provided with a calculating devices such as a CPU; a storage device such as a memory or an HDD (hard disk drive); an input device for detecting an input of information from the outside, such as a keyboard, a mouse, a pointing device, a button, or a touch panel; an interface device for performing transmission and reception of various types of information through a communications line as the Internet, a LAN (local area network) or a WAN (wide area network); and a display device such as a CRT (cathode ray tube), an LCD (liquid crystal display), or an FTP (field emission display); and further structured from a program installed on the computer. That is, the aforementioned interface portion 61, static pressure setting portion 62, memory portion 63, and operation controlling portion 64 are achieved through control of hardware resources by a program, through the combined operations of a hardware device and software. Note that the aforementioned program may be provided in a state that is recorded on a recording medium such as a floppy disk, a CD-ROM, a DVD-ROM, a memory card, or the like.

Static Pressure Setting Operation

Figure 2:
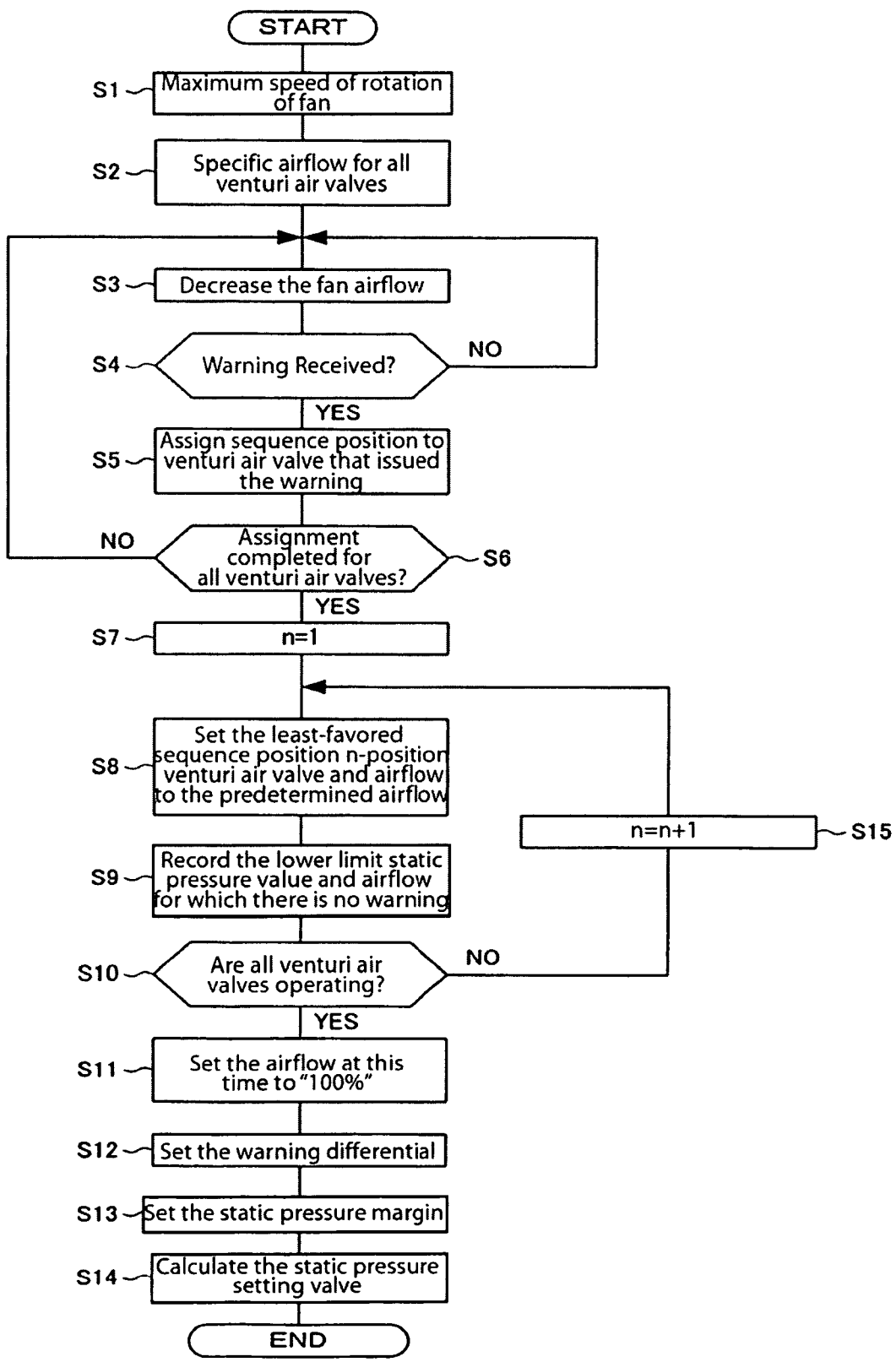
FIG. 2 is a flowchart illustrating the setting operation for the static pressure setting value.

The static pressure setting operation for the ventilating system according to the present form of embodiment will be explained next in reference to FIG. 2

Operation of the Least-Favored Branch Sequence Detecting Portion

First the speed of rotation of the fan 5 is maximize by the least-favored branch sequence detecting portion 62a of the static pressure setting portion 62 (Step S1), and the venturi air valves of all of the fume hoods 2 are set to a predetermined airflow (Step S2).

Here the predetermined airflows for the venturi air valves are appropriate values depending on the types and configurations thereof. As one example, in the case of the venturi air valves with identification numbers 1# through 8#, illustrated in FIG. 1, venturi air valves of any of the identification numbers 1# through 3#, illustrated in FIG. 3, are used.

When the fan 5 and the venturi air valves are set up, the least-favored branch sequence detecting portion 62a gradually reduces the speed of rotation of the fan 5 to reduce the airflow (Step S3), and checks for the reception of a warning indicating that the pressure differential across a venturi air valve, from a differential pressure transmitting device that is attached to the venturi air valve) has fallen below the predetermined level (Step S4). If no warning has been received (Step S4: No), then the least-favored branch sequence determining portion 62a returns to the process in Step S3, and the airflow of the fan 5 is further decreased.

When a warning has been received (Step S4: Yes), then the least-favored branch sequence detecting portion 62a adds, to the sequence, the venturi air valve corresponding to the differential pressure transmitting device that transmitted the warning (Step S5). The venturi air valve of the differential pressure transmitting device that transmits the first warning is given the first-place sequence.

When adding the sequence, the least-favored branch sequence detecting portion 62a checks whether or not sequence numbers have been assigned to all of the venturi air valves (Step S6). The assignment of the sequence numbers is performed for all of the venturi air valves to which differential pressure transmitting devices are attached. Consequently, if there is a venturi air valve for which no sequence number has been assigned (Step S6: No), then processing returns to the process in Step S3.

Sequence numbers are assigned to each of the venturi air valve through iterating the processes in these Steps S3 through S6. This means that the first-place venturi air valve, that is, the venturi air valve corresponding to the differential pressure transmitting device that issued the first warning, is in the least-favored position that is most susceptible to the effects of the head of the fan 5 among all of the branch ducts (hereinafter termed the "least-favored branch"). Note that the sequence numbers assigned using a procedure such as set forth above are stored in the memory portion 63.

For example, in the case of the venturi air valves with identification numbers 1# through 8#, illustrated in FIG. 1, the least-favored sequence numbers assigned in the sequence, starting from 1st place, namely 2#, 3#, 4#, 1#, 7#, 6#, 5#, 8#, are stored in the memory portion 63.

Operation of the Least-Favored Differential Pressure Lower Limit Detecting Portion When sequence numbers have been assigned to all of the venturi air valves by the least-favored branch sequence detecting portion 62a (Step S6: Yes), then the static pressure setting portion 62 first sets n=1 (Step S7), by the least-favored differential pressure lower limit detecting portion 62b, and then sets, to a predetermined airflow, the venturi air valve for which the least-favored sequence number is n (Step S8). Here, in the initial case, the value for n is 1, so the venturi air valve for which the least-favored sequence number is 1 is set to the predetermined airflow.

When the n-place venturi air valve has been sent to the predetermined airflow, then the least-favored differential pressure lower limit detecting portion 62b drives the fan 5 to gradually increase the airflow, while detecting the minimum airflow for which no warning is issued from the differential pressure transmitting device corresponding to that venturi air valve, and stores, in the memory portion 63, that airflow and the static pressure (least-favored differential pressure lower limit) of the main duct 3 in the memory portion 63 (Step S9). In the initial case, the airflow of the fan 5 is the airflow of that venturi air valve. Note that the static pressure in the main duct 3 is detected by the pressure gauge 4.

Figure 5:
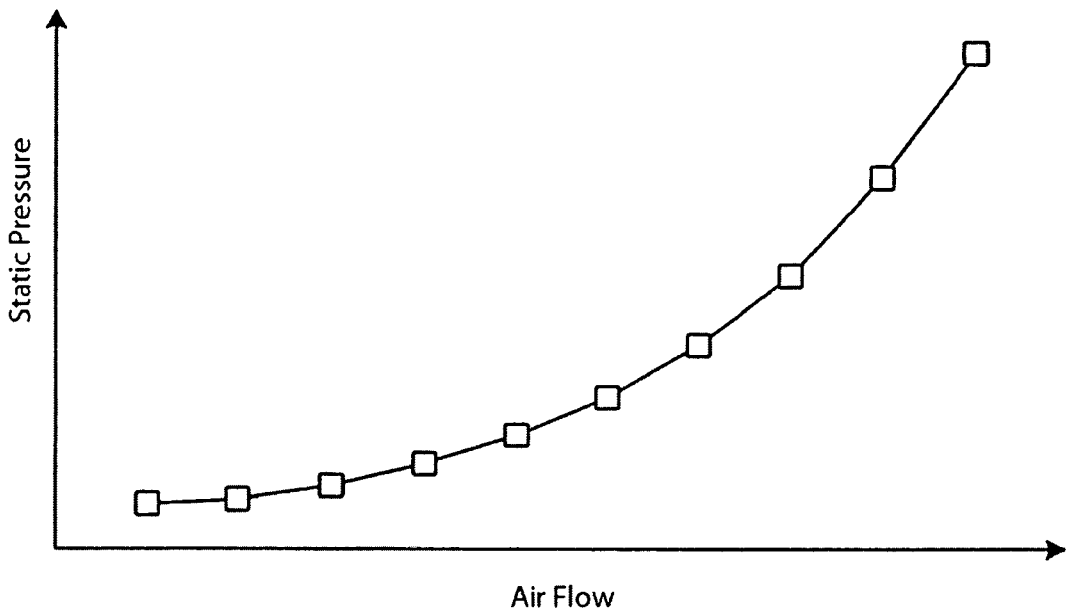
FIG. 5 is a graph illustrating the relationship between the airflow and the least-favored pressure differential lower limit.

When the airflow and the least-favored differential pressure lower limit have been recorded, then the least-favored differential pressure lower limit detecting portion 62b checks whether or not all venturi air valves are operating (Step S10). If not all venturi air valves are operating (Step S10: No), then the least-favored differential pressure lower limit detecting portion 62b sets n=n+1 (Step S21), and processing returns to Step S8. Given this, in, for example, the case wherein the airflow corresponding to the venturi air valve in the least-favored sequence No. 1 position and the least-favored pressure differential lower limit have been recorded, then, in Step S21, the value for n will be set to 2. Consequently, in Step S8, the airflow will be set for the venturi air valve for which the least-favored sequence number is in second place, the minimum airflow for which no wanting is produced from the differential pressure transmitting devices corresponding to the venturi air valves for which the least-favored sequence numbers are first-place for second-place is detected, and this airflow and the static pressure in the main duct 3 at this time (the least-favored differential pressure lower limit) are recorded in the memory portion 63. The airflows and the least-favored static pressure lower limits, when the number of venturi air valves that are operating is increased by 1 each time, are stored in the memory portion 63 through repeating the process such as described above. The relationship between the airflows and the least-favored differential pressure lower limits is illustrated, for example, in the line graph shown in FIG. 5.

When all of the venturi air valves have been caused to operate, through repeating the processes in Steps S8, S9, and S21 (Step S10: Yes), then the least-favored differential pressure lower limit detecting portion 62b sets, as the airflow (hereinafter termed the "system airflow") for which the utilization rate of the ventilating system 1 is 100%, the airflow of the fan 5 at this time, or in other words, the airflow of the fan 5 when in a state wherein all of the venturi air valves that have been set to the predetermined airflows are in an operating state (Step S11). The utilization rates and the least-favored differential pressure lower limits are stored in the memory portion 63 in relation to each other.

Figure 7:
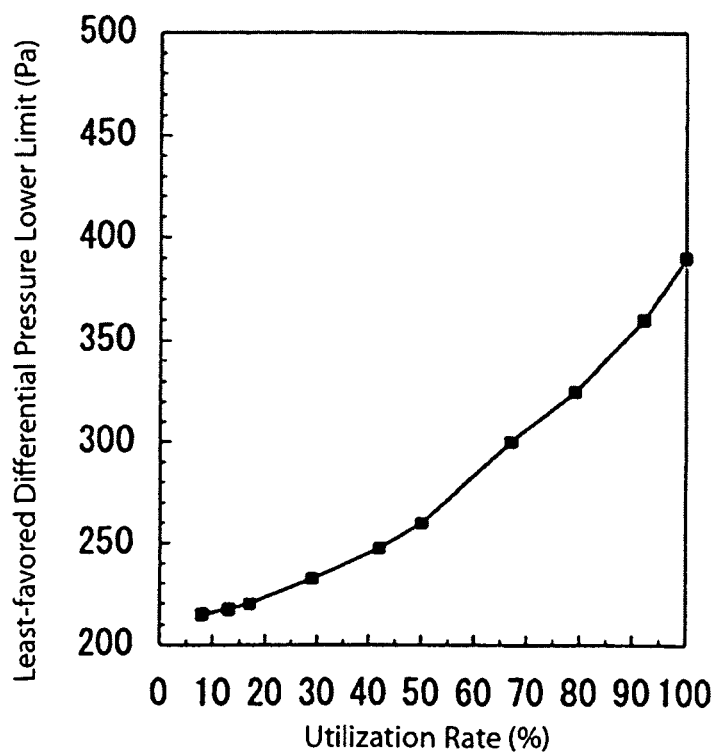
FIG. 7 is a graph illustrating the relationship between the utilization rate and the least-favored differential pressure lower limit in the ventilating system in FIG. 1.

For example, in the case of the venturi air valve 2# of the venturi air valves with identification numbers 1# through 8#, illustrated in FIG. 1, the relationship between the utilization rate and the least-favored differential pressure lower limit is stored in the memory portion 63 as illustrated in FIG. 6. Note that in FIG. 4, the venturi air valve 2#, for which the least-favored branch sequence number is first-place, is a venturi air valve in which the maximum valve airflow is 2000 m³ per hour, and thus in actual operation that is the possibility that the venturi air valve 1# and 3#, which have smaller air flows, can be used independently. Given this, in FIG. 6, No. 1 illustrates the case wherein the 1# venturi air valve is used independently and No. 2 illustrates the case wherein the 3# venturi air valve is used independently. No. 3 through No. 10 illustrate the cases wherein the remaining venturi air valves aside from 1# and 3# have been caused to operate in sequence of the least-favored branch sequence. The utilization rates are the ratios of the system air flows at the time of each of the operations relative to the system air flow when all of the venturi air valves 1# through 8# are operating. When the relationships between the utilization rates and the least-favored differential pressure lower limits are shown in a relational graph, the result is as shown in FIG. 7. FIG. 7 shows the values of each of the least-favored pressure differential lower limits, at each of the utilization rates, as black squares.

Operation of the Warning Differential Setting Portion

When the system airflows have been set, then, in the static pressure setting portion 62, the warning differentials are set by the warning differential setting portion 62c (Step S12). When the warning differential of a venturi air valve that has been set in advance is less than the predetermined operating differential pressure lower limit (the minimum differential pressure) for the venturi air valve, then the difference between this minimum differential pressure and the warning differential pressure is set as the warning differential. The sum of the warning differential and the least-favored differential pressure lower limit is termed the "least-favored required static pressure." At the time of actual operation, there is a tolerance relative to the predetermined airflow. For example, when there is a tolerance of ±5% relative to a predetermined airflow of 1000 m³ per hour, then the range of the tolerable airflows will be between 950 and 1050 m³ per hour. In theory, the warning differential indicates the difference between the differential pressure for the required airflow and the differential pressure for the airflow at the tolerance lower limit. In actuality, when one considers delays in the control operations, surges in the system, and so forth, usually a differential pressure that is lower than the theoretical warning differential is set as the warning differential. Note that the "warning differential pressure" refers to the lower limit of the required differential pressure capable of compensating for tolerances in the predetermined airflow. Furthermore, the "minimum differential pressure" refers to the lower limit of the range where in the predetermined airflow can be maintained in the range of variability of the static pressures in the venturi air valves.

Figure 8:
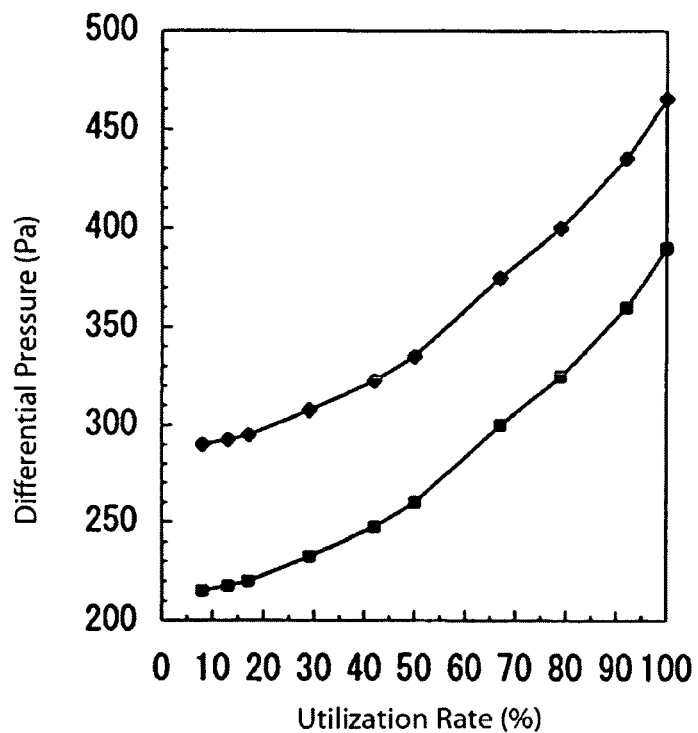
FIG. 8 is a graph illustrating the relationship between the utilization rate and the least-favored required static pressure in the ventilating system in FIG. 1.

For example, in the case of the venturi air valve 2#, of the venturi air valves with identification numbers 1# through 8# illustrated in FIG. 1, the warning differential pressure is 75 Pa and the minimum differential pressure is 150 Pa, as illustrated in FIG. 3, so the warning differential will be 75 Pa (=150−75 Pa). When the value of this warning differential is added to the graph of the least-favored static pressure lower limits illustrated in FIG. 7, the result is the graph of the least-favored required static pressures illustrated in FIG. 8. In FIG. 8, the value for the least-favored required differential pressure at each utilization rate is shown by a black diamond.

Operation of the Static Pressure Margin Setting Portion

Once the warning differentials have been set, then in the static pressure setting portion 62, the static pressure margins are set by the static pressure margin setting portion 62d (Step S13).

When there is a change to the system airflow in the ventilating system 1 due to a change in the speed of rotation of the fan 5, the change in the system airflow cannot be tracked instantaneously by a change in the utilization rate of the fume hoods 2. That is, while a fume hood 2 must draw, with a predetermined airflow, the inside air when opening to a predetermined degree of opening from a state wherein the sash is closed, the timing with which the sash is opened and closed is dependent on the user, and because the speed of rotation of the fan 5 is increased after the opening of the sash is detected, it is not possible for this draw to occur instantaneously. Given this, in the present form of embodiment, an offset is provided in order to increase the static pressure setting value of the main duct 3 by a predetermined value above the least-favored differential pressure lower limit. This offset value is known as the static pressure margin.

Envisioning here a case wherein the number of fume hoods 2 that are added for use is only a single unit, the amount of static pressure variation for the main duct 3 for the single unit is set as the static pressure margin. Consequently, the static pressure setting value for the main duct 3 is set to a value wherein the static pressure margin is added to the least-favored differential pressure lower limit of the main duct corresponding to the utilization rate (the system airflow).

Note that when the predetermined airflows for the individual venturi air valves are not identical, then the amount of variation in the static pressure corresponding to the airflow of the venturi air valve with the largest airflow is set as the static pressure margin. This static pressure margin is termed the least-favored margin.

Additionally, when envisioning the number of fume hoods 2 that are added for use to be two units, then the amount of variation in the static pressure of the main duct 3 for these two units is set as the static pressure margin. If, at this time, the predetermined airflows of each of the venturi air valves are not identical, then an amount of static pressure variation corresponding to the sum of the airflow of the venturi air valve with the greatest airflow and the airflow of the venturi air valve with the second greatest airflow will be set as the least-favored margin.

Additionally, in terms of the least-favored margin, if the sum of the warning differentials exceeds the difference in the normal operating differential pressures of the venturi air valves (the maximum differential pressure−the minimum differential pressure), then it can be considered necessary to change the design of the duct system.

For example in the case of the venturi air valve 2# of the venturi air valves with identification numbers 1# through 8#, illustrated in FIG. 1, when the number of units of the fume hoods 2 that are added for use is envisioned to be a single unit, then, from FIG. 6, the least-favored margin is 35 (=360−325) Pa. Additionally, the sum of the least-favored margin and the warning differential (75+35=110) is smaller than the difference between the normal operating differential pressures of the venturi air valves illustrated in FIG. 3 (750−150=600), and thus it can be seen that the design of the duct system illustrated in FIG. 1 is not problematic.

Operation of the Static Pressure Setting Value Calculating Portion

Figure 9:
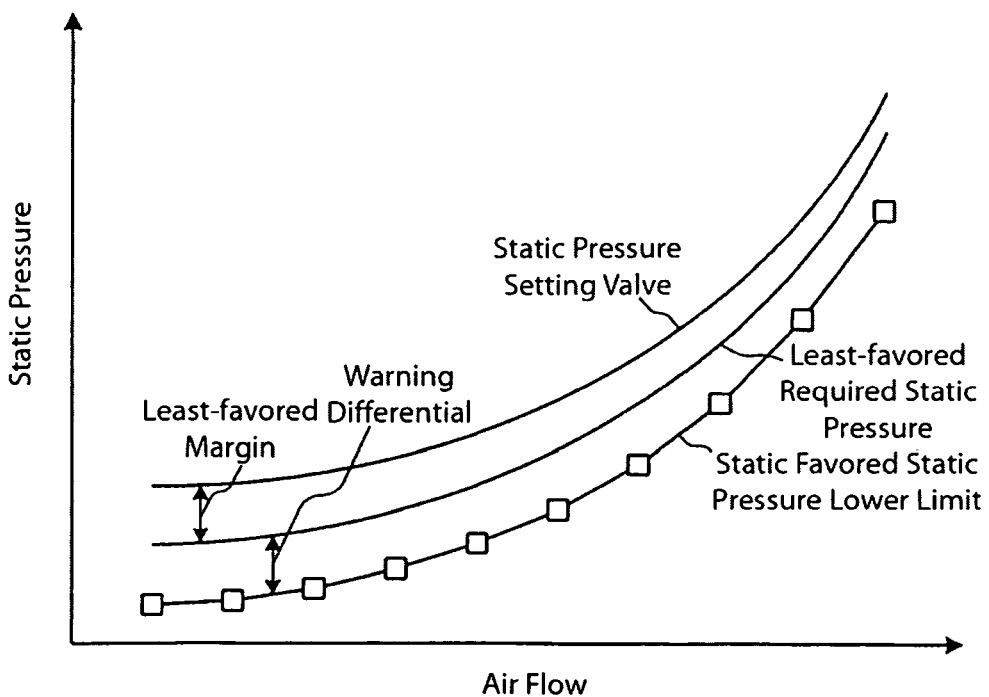
FIG. 9 is a graph illustrating the relationship between the airflow, the least-favored differential pressure lower limit, the least-favored required static pressure, and the static pressure setting value.

When the warning differentials have been set, then, in the static pressure setting portion 62, the static pressure setting value calculating portion 62e uses the sum of the venturi air valves that are in use (that is, the utilization rate) to calculate the static pressure setting value by adding the least-favored margin to the least-favored required static pressure, wherein the warning differential has been added to the least-favored differential pressure lower limit, regardless of the least-favored sequence of the venturi air valves that are actually in use (Step S14). The static pressure setting values are calculated for each utilization rate corresponding to each of the venturi air valves, and when these are joined together, they form the static pressure setting value curve as illustrated in FIG. 9. This static pressure setting value curve is stored in the memory portion 63.

Figure 10:
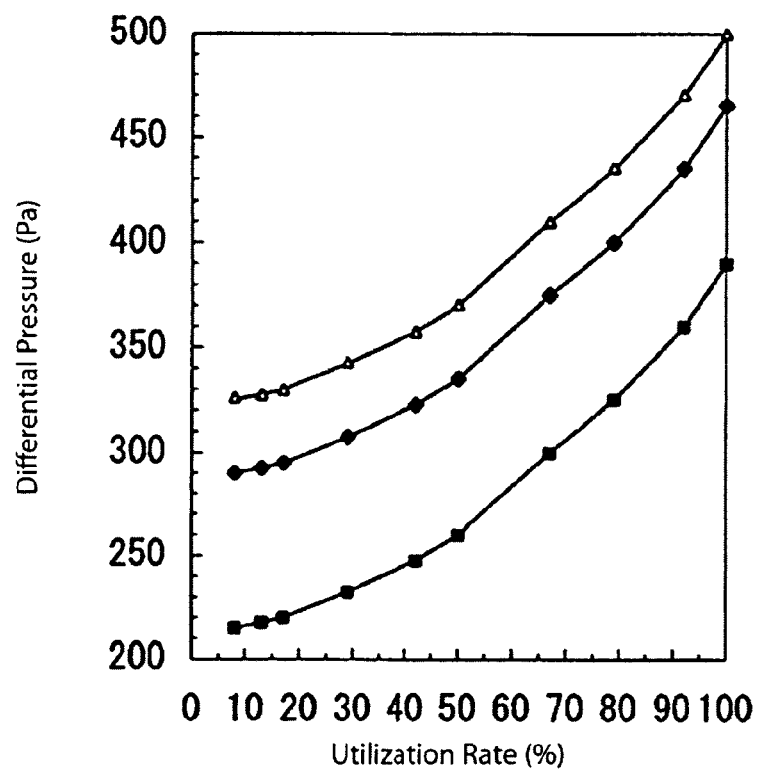
FIG. 10 is a graph illustrating the relationship between the utilization rate, the least-favored differential pressure lower limit, the least-favored required static pressure, and the static pressure setting value in the ventilating system in FIG. 1.
Figure 12:
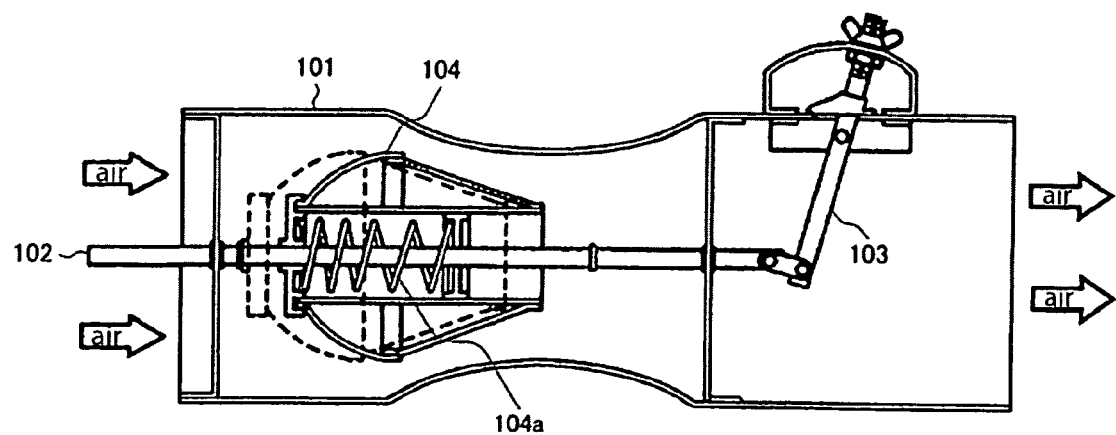
FIG. 12 is a diagram illustrating the structure of a venturi air valve.
Figure 13:
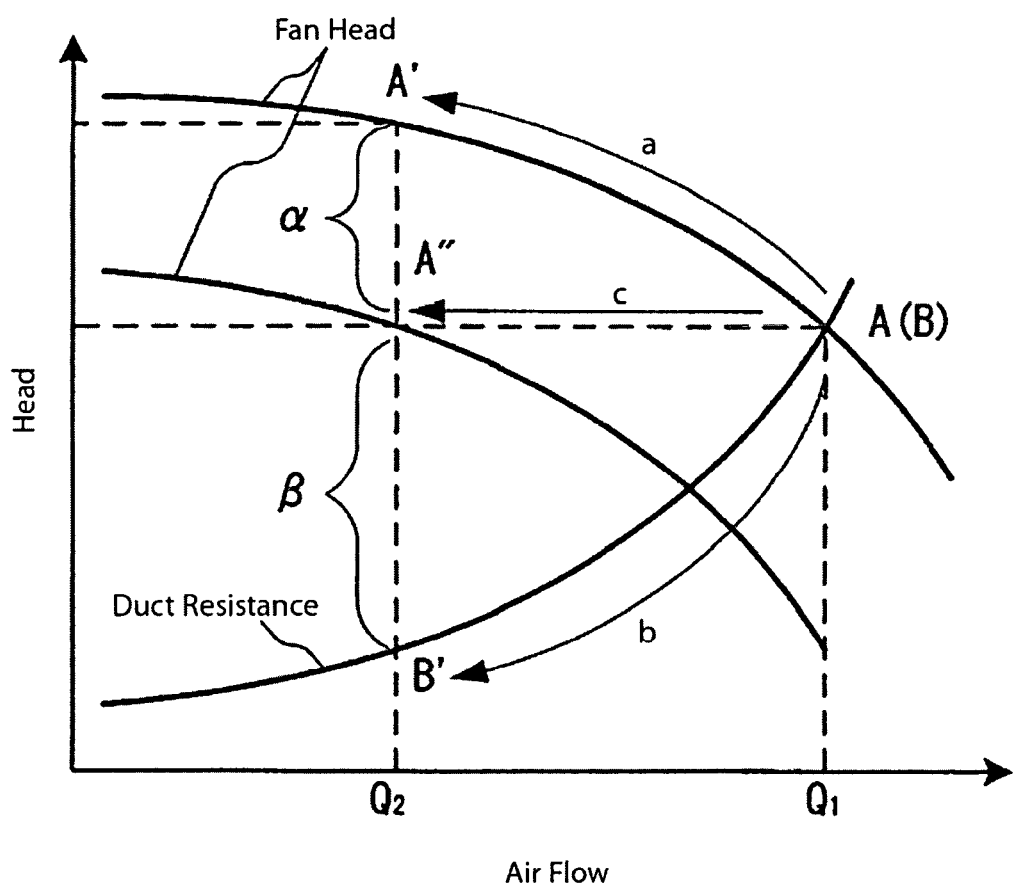
FIG. 13 is a diagram illustrating the relationship between the fan airflow and the head.

For example in the case of the venturi air valve 2# of the venturi air valves with identification numbers 1# through 8#, illustrated in FIG. 1, when the least-favored margin of 35 Pa is added to the graph of the least-favored differential pressure lower limit, illustrated in FIG. 8, the result is the graph of the static pressure setting values illustrated in FIG. 10. In this FIG. 10, the static pressure setting values for each of the utilization rates are illustrated by the white triangles.

The static pressure setting values set by this type of static pressure setting operation are used in controlling the speed of rotation of the fan 5 by the operation controlling portion 64. Specifically, the operation controlling portion 64 extracts the static pressure setting value corresponding to the current utilization rate, from the static pressure setting value curve stored in the memory portion 63, and then controls the speed of rotation of the fan 5 through PID control or feedback control based on the difference between this static pressure setting value and the measured value for the static pressure of the main duct 3 received from the pressure gauge 4. As a result, even if the airflows in each of the venturi air valves are different and the changes in the duct resistances relative to each of the changes in airflows are different, it is possible to control the speed of rotation of the fan 5 while maintaining the predetermined head of the ventilating system while achieving energy conservation using simple control logic.

As explained above, given the present form of embodiment, the static pressure setting value is set based on the airflow of the system as a whole, calculated from the airflow of the venturi air valves of the fume hoods 2 that are in operation, and the speed of rotation of the fan 5 is controlled based on the static pressure setting value and the static pressure within the main duct 3, thereby making it possible to control the speed of rotation of the fan 5 while maintaining the airflow of the ventilating system, and thus making it possible to prevent wasted energy in the fan 5, resulting in the ability to advance energy conservation, even when there are differences in the airflows between the individual venturi air valves, and differences in the changes in resistance in the multiply-branched duct system relative to changes in the individual airflows.

Note that while the explanation for the present example of embodiment was for a case wherein a least-favored margin was set, the least-favored margin need not be set in the case wherein a sensor that can sense people, or a sensor that can detect the proximity of a human body, such as a proximity sensor, is provided in the equipment wherein the venturi air valve is provided. In this case, when the proximity of a human body to the equipment wherein the venturi air valve is equipped is detected, then the static pressure margin corresponding to that equipment, or the least-favored margin, should be added to the static pressure setting value. This makes it possible to achieve a further energy reduction by taking into consideration the timing with which there will be changes in the speed of rotation of the fan 5.

Additionally, typically the resistance of a duct system is proportional to the square of the airflow. That is, the increase in the resistance in the duct system, relative to the increase in the unit airflow, varies depending on the airflow at that time. This tendency is seen in, for example, FIG. 6. Consequently, the least-favored margin may be handled as a function of the airflow. Specifically, the least-favored pressure differential lower limit may be calculated through Equation (1), below, when the utilization rate of the system airflow is defined as x and the system differential pressure is defined as y:

$$y = 156.87x^2 + 15.63x + 288.02 \qquad (1)$$

In the case wherein the system airflow is in units of 500 m³ per hour, the change in margin for each unit airflow, relative to the airflow at that time, is as illustrated in FIG. 11. Setting the least-favored margin for each unit relative to the airflow at that time, as in FIG. 11, enables yet a further advancement in energy conservation.

Additionally, controlling the speed of rotation of the fan 5 so as to vary the static pressure setting value in the main duct 3 enables the driving force of the fan 5 to be conserved while maintaining the exhaust airflow of the ventilating system. At a utilization rate of 17%, for example, in FIG. 6 (that is, a system airflow of 2000 m³ per hour), there is the case wherein the 2# venturi air valve (which has a valve airflow of 2000 m³ per hour) is used alone, and the case wherein the 1# and 8# venturi air valves (which each have valve airflows of 1000 m³ per hour) are operated simultaneously. Given this, the one of these two cases that has the higher required static pressure may be defined as the least-favored required static pressure at this utilization rate. Similarly, with the utilization rate of 21% in FIG. 11 (at the system airflow of 2500 m³ per hour), there is the case of the 1# and 3# venturi air valves being operated simultaneously, and when compared to the value interpolated using equation (1), above, the one with the higher required static pressure may be used as the least-favored required static pressure at that utilization rate.

The present invention can be applied to various types of systems provided with fans and various types of controllers for controlling the speed of rotation of the fans.

The invention claimed is:

1. A ventilating system comprising:
a multi-branched duct system comprising:
    a main duct and a plurality of branch ducts that branch from the main duct;
    a plurality of exhaust devices configured to expel, to outside of the exhaust devices, inside air through venturi air valves that are connected to the branch ducts, respectively;
    a fan that is equipped in the main duct; and
    a control device configured to control speed of rotation of the fan and maintain a predetermined head of the fan, wherein:
    the control device sets a target static pressure value based on airflow of the entire ventilating system, calculated from the airflows of the venturi air valves of the exhaust devices during operation, and controls the speed of rotation of the fan and maintains the predetermined head of the fan, based on a static pressure within the main duct and the target static pressure value, in relation to changes in duct resistances relative to changes in the airflows of the venturi air valves.

2. The ventilating system as set forth in claim 1, further comprising:
    a recording device configure to record relationship between the airflow of the entire system and the target static pressure, wherein:
    the control device sets the target static pressure value based on the relationship recorded in the recording device; and
    the recording device obtains the relationship through gradually decreasing the airflow of the entire system from a state wherein all of the exhaust devices are operating, assigning sequence positions to the exhaust devices corresponding to the venturi air valves in a sequence that does not produce a pressure differential between sequential venturi air valves when the venturi air valves are operating properly, and recording a minimum static pressure value in the main duct that is required when actuating one or more of the exhaust devices beginning with a low sequence position.

3. The ventilating system as set forth in claim 2, wherein:
    the recording device obtains the relationship through adding the minimum static pressure value to an amount of change of a lower limit value for the static pressure in the main duct when the exhaust device corresponding to the venturi air valve with a greatest airflow among the venturi air valves has been actuated.

4. A ventilating system control method for a ventilating system, comprising:
    providing a multi-branched duct system with a main duct and a plurality of branch ducts that branch from the main duct;
    expelling by a plurality of exhaust devices inside air to the outside of the exhaust devices, through venturi air valves that are connected to the branch ducts, respectively;
    providing the main duct with a fan;
    calculating, from airflows of the venturi air valves of the exhaust devices during operation, a target static pressure;
    during operation, setting the control device at the target static pressure value based on airflow of the entire ventilating system; and
    controlling speed of rotation of the fan and maintaining a predetermined head of the fan, based on a static pressure within the main duct and the target static pressure value, in relation to changes in duct resistances relative to changes in the airflows of the venturi air valves.

* * * * *